United States Patent
Emuchay et al.

(10) Patent No.: US 9,313,186 B2
(45) Date of Patent: *Apr. 12, 2016

(54) FEDERATED TRANSACTION PATH AND SERVICE LEVEL AGREEMENT MONITORING ACROSS SERVICE ORIENTED APPLICATION PARTNER DOMAINS

(75) Inventors: Nduwuisi Emuchay, Austin, TX (US); Gautham Pamu, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1995 days.

This patent is subject to a terminal disclaimer.

(21) Appl. No.: 12/363,167

(22) Filed: Jan. 30, 2009

(65) Prior Publication Data

US 2009/0132704 A1 May 21, 2009

Related U.S. Application Data

(63) Continuation of application No. 11/426,432, filed on Jun. 26, 2006, now Pat. No. 7,493,302.

(51) Int. Cl.
*G06F 17/30* (2006.01)
*H04L 29/06* (2006.01)
*H04L 29/08* (2006.01)

(52) U.S. Cl.
CPC .............. *H04L 63/08* (2013.01); *H04L 67/22* (2013.01); *G06F 17/30368* (2013.01); *Y10S 707/99931* (2013.01); *Y10S 707/99945* (2013.01)

(58) Field of Classification Search
CPC ................................................ G06F 17/30368
USPC .......... 707/603, 999.001, 694, 702, 718, 955, 707/962; 709/224
See application file for complete search history.

(56) References Cited

U.S. PATENT DOCUMENTS

| | | | |
|---|---|---|---|
| 5,978,818 A * | 11/1999 | Lin ............................... | 715/209 |
| 6,070,190 A | 5/2000 | Reps et al. | |
| 7,493,302 B2 * | 2/2009 | Emuchay et al. ..................... | 1/1 |
| 8,694,423 B2 * | 4/2014 | Wajih et al. ..................... | 705/39 |
| 2002/0194504 A1 * | 12/2002 | Leskuski et al. .............. | 713/201 |
| 2003/0097464 A1 | 5/2003 | Martinez et al. | |
| 2003/0120771 A1 * | 6/2003 | Laye et al. ................... | 709/224 |
| 2004/0064552 A1 * | 4/2004 | Chong et al. .................. | 709/224 |
| 2004/0117311 A1 | 6/2004 | Agarwal et al. | |
| 2004/0205187 A1 | 10/2004 | Sayal et al. | |
| 2005/0071182 A1 | 3/2005 | Aikens et al. | |
| 2005/0156736 A1 | 7/2005 | Rajapakse et al. | |
| 2005/0171810 A1 * | 8/2005 | Klein et al. ....................... | 705/1 |

(Continued)

*Primary Examiner* — Jean M Corrielus
(74) *Attorney, Agent, or Firm* — Yee & Associates, P.C.; Joseph Petrokaitis

(57) ABSTRACT

Computer implemented method, system and computer usable program code for monitoring a transaction that crosses an enterprise boundary in a composite application. A computer implemented method for monitoring a transaction that crosses an enterprise boundary in a composite application includes a provider enterprise of the transaction receiving a request to provide monitoring data regarding the transaction to a requester enterprise of the transaction. The received request includes a correlation token identifying the monitoring data to be provided and the requester enterprise as being authorized to receive the monitoring data. The transaction monitoring data is then provided to the requester enterprise. The provided transaction monitoring data may be analyzed by the requester enterprise to provide analysis results regarding transaction delivery performance.

2 Claims, 3 Drawing Sheets

(56) References Cited

U.S. PATENT DOCUMENTS

| | | |
|---|---|---|
| 2005/0172027 A1 | 8/2005 | Castellanos et al. |
| 2005/0209876 A1* | 9/2005 | Kennis et al. .................... 705/1 |
| 2005/0262025 A1* | 11/2005 | Wajih et al. .................... 705/64 |
| 2006/0167891 A1* | 7/2006 | Blaisdell et al. ............... 707/10 |
| 2006/0167892 A1* | 7/2006 | Chagoly et al. ............... 707/10 |
| 2006/0171402 A1* | 8/2006 | Moore et al. .................. 370/401 |
| 2007/0150568 A1* | 6/2007 | Ruiz ............................. 709/223 |
| 2007/0299803 A1* | 12/2007 | Emuchay et al. ................ 707/1 |
| 2008/0082374 A1* | 4/2008 | Kennis et al. .................... 705/7 |
| 2008/0082376 A1* | 4/2008 | Kennis et al. .................... 705/7 |
| 2008/0082377 A1* | 4/2008 | Kennis et al. .................... 705/7 |
| 2008/0195579 A1* | 8/2008 | Kennis et al. .................... 707/3 |

\* cited by examiner

FEDERATED TRANSACTION PATH AND SERVICE LEVEL AGREEMENT MONITORING ACROSS SERVICE ORIENTED APPLICATION PARTNER DOMAINS

This application is a continuation of application Ser. No. 11/426,432, filed Jun. 26, 2006, status allowed.

BACKGROUND OF THE INVENTION

1. Field of the Invention

The present invention relates generally to the data processing field and, more particularly, to a computer implemented method, system and computer usable program code for monitoring a transaction that crosses an enterprise boundary in a composite application.

2. Description of the Related Art

Composite applications are n-tiered applications which interact with multiple systems, subsystems, interfaces and programming environments to provide customer service and business value. Composite applications are becoming more service oriented and as such may be termed Service Oriented Application (SOA)-based composite applications.

SOA-based composite applications are often applied in environments that require interaction across enterprise boundaries as well as within an enterprise. With composite applications, for example, transactions can be between business units, divisions, and other entities inside an enterprise; and also across enterprise boundaries as the enterprise accesses business services and applications offered by suppliers (service providers) located outside the enterprise.

In SOA-based composite applications that include cross-enterprise transactions, enterprises often encounter problems with respect to the services they interact with or rely on for their business processes. Such problems, for example, can include problems relating to response time in receiving a service, availability of the service when it is needed, cost for the service, and the like. In view of such potential service problems, it is important that an enterprise receiving services maintain Service Level Agreements (SLAs) with service providers to help assure acceptable service delivery.

Notwithstanding SLAs between parties, however, it can be quite challenging for an enterprise receiving services in a composite application to gather reliable and authoritative data regarding service delivery and other business transactions that cross enterprise boundaries in a manner that is acceptable to the service providers and to other business partners in the composite application. For example, when a transaction crosses an enterprise boundary between two or more partners, questions arise as to which partner is responsible for supplying data for SLA measurement, and as to how that partner might gather and provide the data in a manner that allows other partners to be assured that the data is accurate, that it was collected at the right time and that it is directly applicable to the SLA in question. It is also important that the transaction data be correlated across enterprise boundaries in such a way that provides visibility and confidence to all participating partners.

Currently, there are security certificate companies which validate certificates used by service providers on the Internet; however, there are no service level management companies that can ensure that providers are meeting SLA requirements with respect to delivery of services in a composite application. Currently, no satisfactory mechanisms are in place for an enterprise receiving a service in a composite application to identify the cause of a service delivery problem as a transaction flows across enterprise boundaries. Even though the enterprise receiving the service can ascertain that the service is not meeting SLA requirements, there is no mechanism that enables the enterprise to independently gather and analyze data concerning the cause of the problem and for sharing the data across enterprise boundaries.

There is, accordingly, a need for a mechanism for enabling a recipient of a service or other transaction that crosses an enterprise boundary in a composite application to independently monitor the transaction.

SUMMARY OF THE INVENTION

Exemplary embodiments provide a computer implemented method, system and computer usable program code for monitoring a transaction that crosses an enterprise boundary in a composite application. A computer implemented method for monitoring a transaction that crosses an enterprise boundary in a composite application includes a provider enterprise of the transaction receiving a request to provide monitoring data regarding the transaction to a requester enterprise of the transaction. The received request includes a correlation token identifying the monitoring data to be provided and the requester enterprise as being authorized to receive the monitoring data. The transaction monitoring data is then provided to the requester enterprise. The provided transaction monitoring data may be analyzed by the requester enterprise to provide analysis results regarding transaction delivery performance.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an exemplary embodiment when read in conjunction with the accompanying drawings, wherein:

DETAILED DESCRIPTION OF THE PREFERRED EMBODIMENT

Figure 1:
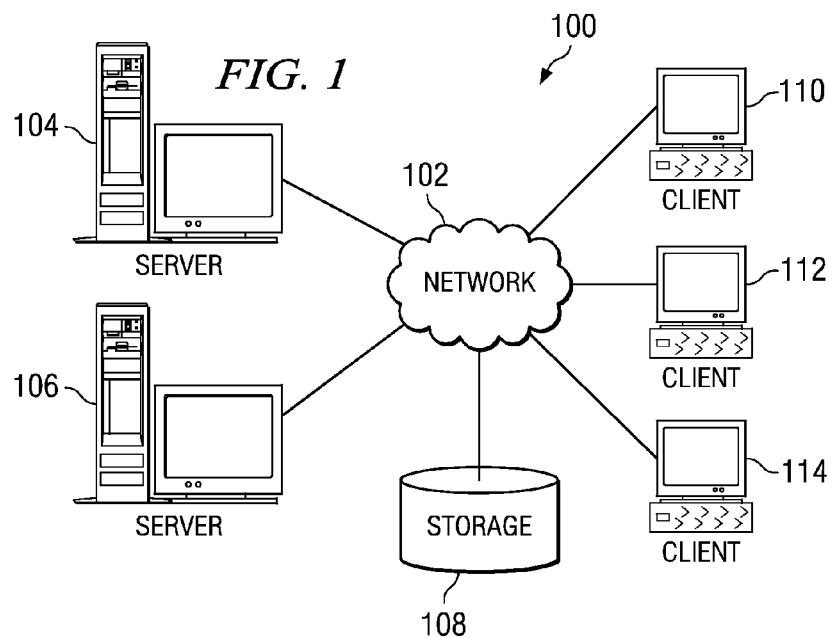
FIG. 1 depicts a pictorial representation of a network of data processing systems in which exemplary embodiments may be implemented.
Figure 2:
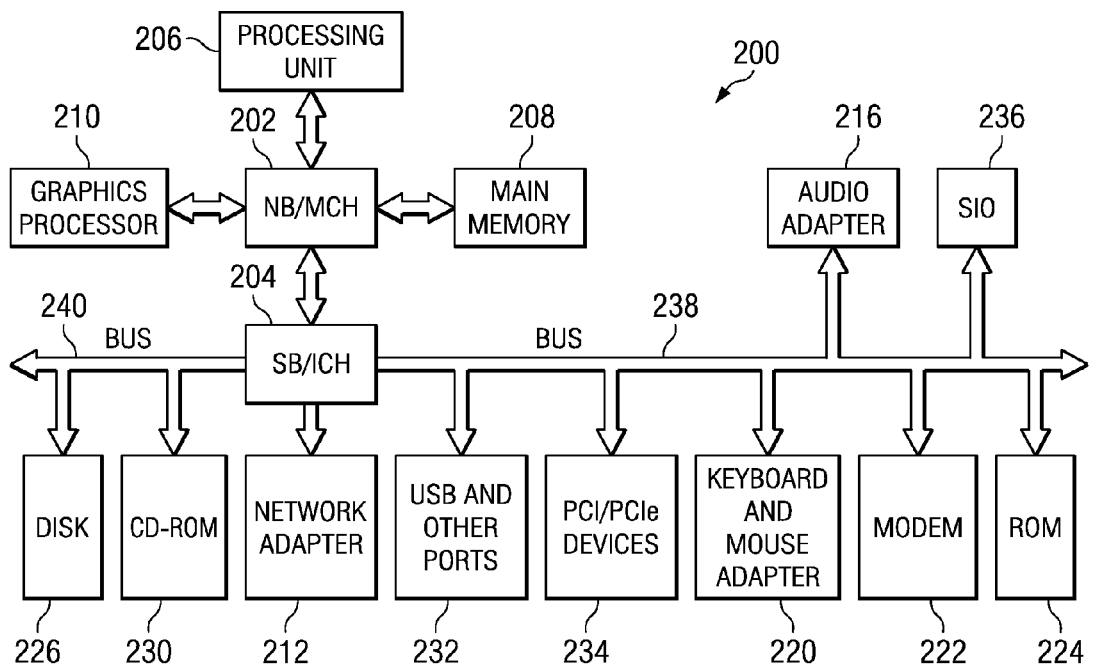
FIG. 2 illustrates a block diagram of a data processing system in which exemplary embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which exemplary embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which exemplary embodiments may be implemented. Data processing system 200 is an example of a computer, such as server 104 or client 110 in FIG. 1, in which computer usable code or instructions implementing the processes may be located for the exemplary embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
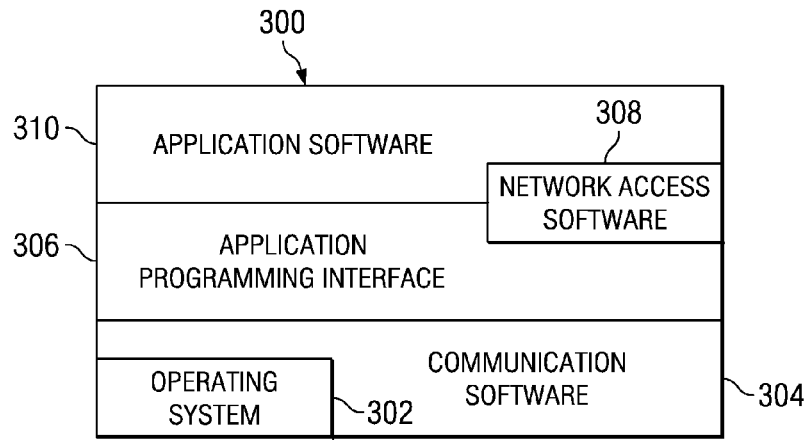
FIG. 3 illustrates a typical software architecture for a server-client system in accordance with an exemplary embodiment.

Turning to FIG. 3, typical software architecture for a server-client system is depicted in accordance with an exemplary embodiment. At the lowest level, operating system 302 is utilized to provide high-level functionality to the user and to other software. Such an operating system typically includes a basic input output system (BIOS). Communication software 304 provides communications through an external port to a network such as the Internet via a physical communications link by either directly invoking operating system functionality or indirectly bypassing the operating system to access the hardware for communications over the network.

Application programming interface (API) 306 allows the user of the system, an individual, or a software routine, to invoke system capabilities using a standard consistent interface without concern for how the particular functionality is implemented. Network access software 308 represents any software available for allowing the system to access a network. This access may be to a network, such as a local area network (LAN), wide area network (WAN), or the Internet. With the Internet, this software may include programs, such as Web browsers. Application software 310 represents any number of software applications designed to react to data through the communications port to provide the desired functionality the user seeks. Applications at this level may include those necessary to handle data, video, graphics, photos or text, which can be accessed by users of the Internet. The mechanism of the present invention may be implemented within communications software 304 in these examples.

Exemplary embodiments provide a computer implemented method, system and computer usable program code for monitoring transactions that cross enterprise boundaries in a composite application. More particularly, exemplary embodiments provide a mechanism by which a service requester in a composite application can gather authoritative data regarding the delivery of the service provided by a service provider to identify the cause of any delivery problems that may arise.

In the following description, an enterprise that requests a service supported by a composite application is sometimes referred to as a "Service Requestor;" and an enterprise that provides the service is sometimes referred to a "Service Provider." An enterprise may be a company or other organization, or an individual.

A Service Provider in a composite application will typically monitor the services it provides in order to ensure proper delivery of the services. When the transaction crosses an enterprise boundary, however, there is no secure mechanism by which this information can be presented to a Service Requestor so that the Service Requestor can ensure that it is receiving the services it requires and that it has paid for.

Exemplary embodiments provide a mechanism by which a Service Provider can share monitoring data relating to a particular transaction of interest with a Service Requestor through a secure interface such as a Web Services interface. The monitoring data received by the Service Requestor and supplied by the Service Provider enables federation of transaction path data for monitoring SOA-based composite applications for response time, availability, cost and other factors.

In accordance with exemplary embodiments, SLA contracts relating to transaction response time, availability and the like are set up between two or more enterprises across enterprise boundaries, and a mechanism is provided to measure against these in a secure, mutually agreed upon manner. With exemplary embodiments, entire transaction paths across enterprise boundaries can be viewed for various purposes including transaction behavior and root cause analysis. More particularly, with the capabilities provided by exemplary embodiments, business partners engaged in SOA-based composite application transactions can accurately measure Quality of Service (QoS) as compared to defined SLAs.

In accordance with exemplary embodiments, enterprises can utilize the monitoring mechanism to precisely control what information is shared among business partners. For example, a Service Provider may not want a Service Requestor to obtain certain information for security reasons. In accordance with exemplary embodiments, the Service Provider can control the information it will share, and this can be specified and agreed to by the Service Requestor in the SLA entered into between the parties. In general, the SLA between a Service Provider and a Service Requestor will guide the information that is to be shared. Appropriate information that is typically shared includes transaction response time and availability information. Inappropriate information for sharing can include User Identity information related to fulfilled transactions; security credentials, such as passwords, related to transactions and fulfillment; and information considered not to be relevant to the goal of assuring and reporting on transaction behavior as defined and agreed upon between interacting parties.

Figure 4:
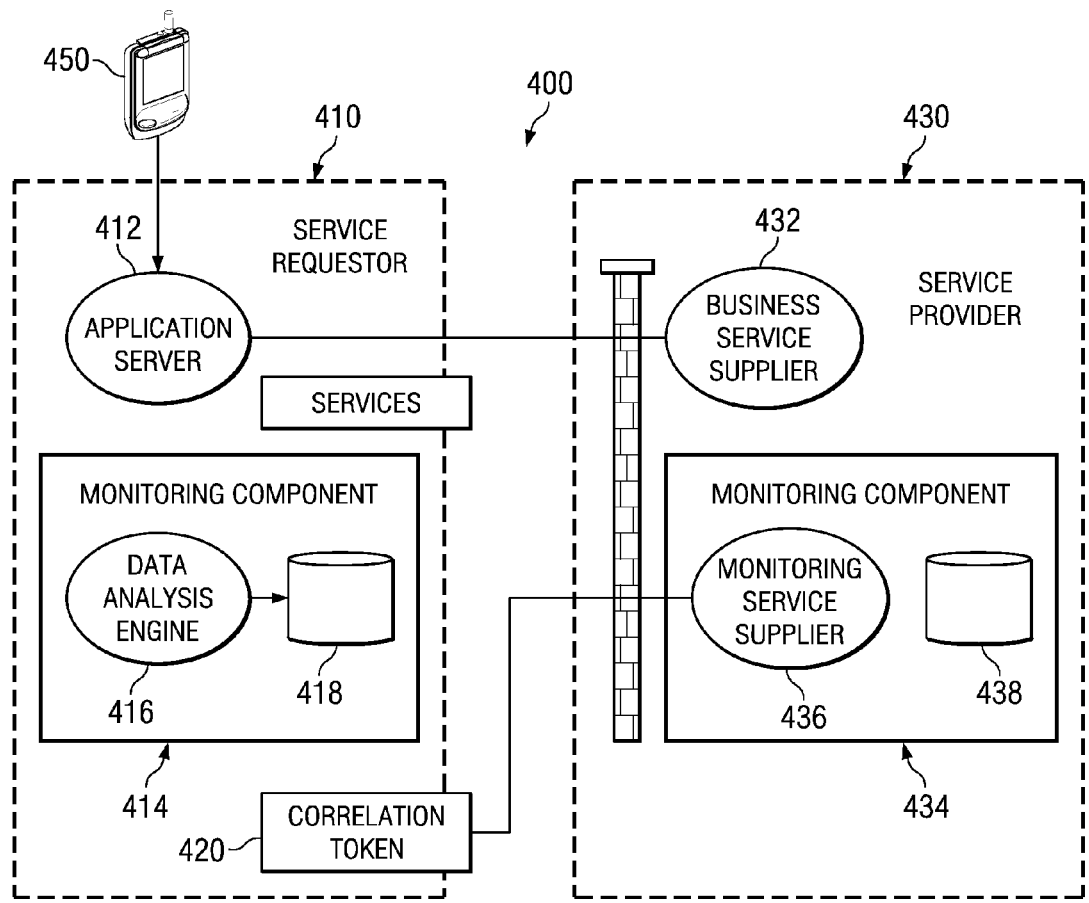
FIG. 4 is a block diagram that schematically illustrates a system for monitoring a transaction in a composite application in accordance with an exemplary embodiment.

FIG. 4 is a block diagram that schematically illustrates a system for monitoring a transaction in a composite application in accordance with an exemplary embodiment. The system is generally designated by reference number 400, and includes Service Requestor 410 and Service Provider 430. Although only one Service Requestor and one Service Provider is shown as being included in system 400, it should be understood that additional business partners in the composite application may also be included.

Service Requestor 410 includes application server 412 and a monitoring component, generally designated by reference number 414. Monitoring component 414 includes data analysis engine 416 and data archive unit 418. Service Provider 430 includes business service supplier 432 and monitoring component 434. Monitoring component 434 includes monitoring web services interface 436 and data archive unit 438.

As schematically illustrated in FIG. 4, business service supplier 432 of Service Provider 430 supplies one or more requested services (transactions) to Service Requestor 410 via application server 412 or another suitable mechanism. In addition, monitoring component 414 of Service Requestor 410 is provided to receive monitoring data regarding delivery of the one or more services to the Service Requestor. As shown in FIG. 4, delivery of the service is monitored by monitoring web services 436 of monitoring component 434 in Service Provider 430, and is stored for subsequent use in data archive unit 438. The monitored data is delivered to the Service Requestor via a secure interface such as a Web services interface.

When Service Requestor 410 wishes to receive monitoring data from Service Provider 430, it sends a request for the monitoring data to Service Provider 430 by sending a correlation token, schematically illustrated at 420 in FIG. 4, to the Service Provider, preferably in a protocol header or body (e.g., HTTP, HTTPS, SOAP). Alternatively, the Service Requestor and the Service Provider may schedule periodic updates rather than the Service Provider manually initiating requests for the monitoring data. Correlation token 420 may contain various types of information. Typically, the correlation token will include an ID identifying the Service Requestor so that the Service Provider will know that the Service Requestor is authorized to receive monitoring data. In addition, the correlation token may indicate a time period for which the monitoring data is requested and the specific transaction or transactions for which the data is requested.

Figure 5:
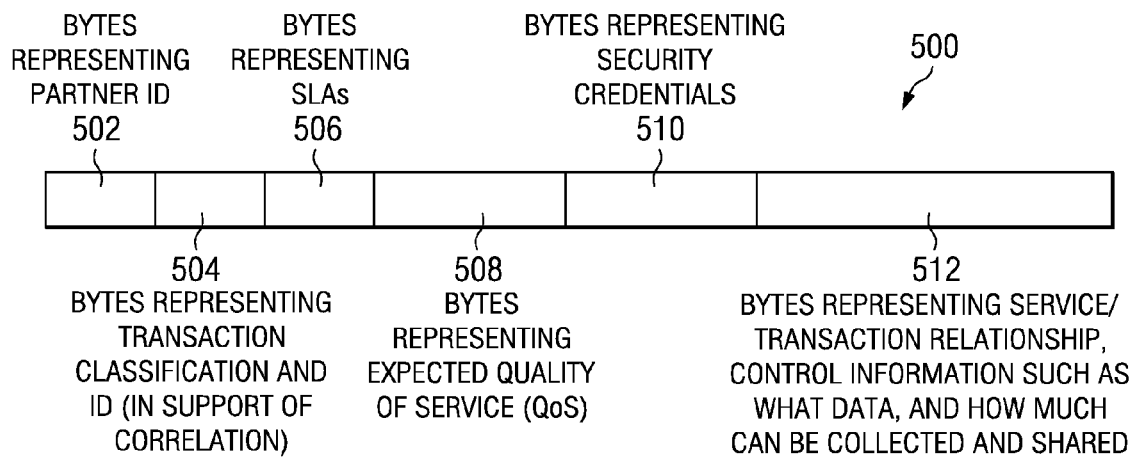
FIG. 5 schematically illustrates the correlation token of FIG. 4 in greater detail in accordance with an exemplary embodiment.

FIG. 5 schematically illustrates the correlation token of FIG. 4 in greater detail in accordance with an exemplary embodiment. The correlation token is generally designated by reference number 500, and may be of a fixed or variable length. Correlation token 500 includes a plurality of byte fields providing various types of information with respect to the request for monitoring data. As shown in FIG. 5, for example, correlation token 500 includes bytes 502 that represent an ID of the Requestor Party, and bytes 504 that represent a classification of the particular transaction for which monitoring data is requested and an ID in support of the correlation. Correlation token 500 also includes bytes 506 representing SLAs by which the request for monitoring data has been agreed to between the parties.

Bytes 508 represent the expected QoS to be provided by the Service Provider, and bytes 510 represent security credentials. Bytes 512 represent the service/transaction relationship, and include control information such as what data and how much data can be collected and shared. It should be understood that correlation token 500 illustrated in FIG. 5 is intended to be only one example of a correlation token that may be used, and that many other configurations can also be used, if desired.

Service Provider 430 receives the correlation token and supplies the requested monitoring data to Service Requestor 410. In the case that that there are downstream entities involved in providing the service, Service Provider 430 may also pass appropriate tokens to downstream processes.

In order to be able to receive monitoring data from Service Provider 430, it is necessary to configure the monitoring application with the end point of the Service Provider. This is not a problem inasmuch as the Service Requestor will typically already have entered into a contract with the Service Provider to receive the monitoring data. Monitoring component 414 can request the monitoring data at regular intervals or at particular times as specified in correlation token 420.

Monitoring component 434 of Service Provider 430 monitors services provided to Service Requestor 410, and stores the monitoring data in data archive unit 438. When Service Requestor 410 requests the monitoring data via correlation token 420, the monitoring data is sent to monitoring component 414 of Service Requestor 410 in an appropriate secure manner.

The monitoring data that is sent to Service Requester 410 can be sent in any format as long as it is serializable (i.e., it is in a form that can be read and interpreted by the Service Requestor). In accordance with an exemplary embodiment, the monitoring data is sent to the Service Requestor in the form of a datagraph containing the requested monitoring data.

A datagraph is a mechanism that provides a container for a tree of data objects. A Service Data Object (SDO) client, the Service Requestor in the present situation, can traverse a datagraph and read and modify its data objects. SDO is a disconnected architecture because SDO clients are disconnected from a Data Mediator Service (DMS) and the data source such that SDO client can only see the datagraph. A datagraph contains a root data object; all of the root's associated data objects, and a change summary. When being transmitted between application components, for example, between a Service Requestor and a Service Provider during service invocation, to the DMS, datagraphs are serialized to XML. The SDO specification provides the XML schema of the serialization.

The received monitoring data is stored in data archive unit 418. The received monitoring data is also analyzed by data analysis engine 416, and the results of the analysis are also stored in data archive unit 418.

When a user, designated by reference number 450 in FIG. 4, wishes to view the results of the data analysis, the user requests the results, and the results are displayed or otherwise provided to the user. The user may be associated with the Service Requestor or with another business partner in the composite application authorized to receive the monitoring data. The results may include, for example, response time metrics, availability metrics, cost information, and the like. Using the results, the user can ascertain performance characteristics of the provided service, accurately measure QoS as compared to defined SLAs, and identify the root cause or causes of any service delivery problems that may have occurred. The user may then take any necessary or desired actions/business decisions based on the results.

With respect to ensuring that a correlation token comes from an authorized Service Requestor and not from an imposter, the token includes embedded information in bytes 502 representing Partner ID as well as other control information. The embedded information could, for example, be a Globally Unique Identifier (GUID) that is used to validate and recognize a partner to a transaction. The Partner ID and other information are used to organize how and what information is stored on the Service Provider's side. Interactions with the Service Provider's Web Service are authenticated and authorized using a WS-security mechanism or other suitable mechanisms.

On the Service Provider's side, (or, perhaps, at an intermediate broker), a check is performed against a policy database to validate that a request for SLA or other information is from an entitled Service Requestor for the appropriate level and nature of information requested by the Service Requestor.

In accordance with an exemplary embodiment, the WS-security standard is used to achieve control with respect to the sharing of information. The Service Provider can, for example, use WS-Security 1.0 for Web Service interaction and use security credentials in the correlation token for further authenticating the data access as part of a request for monitoring data.

In accordance with a specific example, the application server supports the WS-Security 1.0 standard and the signing and encryption of any SOAP (Simple Object Access Protocol) element within the message. Among methods that can be used for selection of elements to be signed and encrypted include a keyword-based method and the XPATH method. The keyword-based method is relatively easy to use and supports most common usage scenarios; while the XPATH method, although more complex, allows selection of elements not supported by keywords to be signed and encrypted. Using these methods, virtually any SOAP element in a SOAP message can be secured.

The Service Provider, accordingly, can provide Web Service with security constraints based on the WS-Security 1.0 standard so that it is able to authenticate the request from the Service Requestor. The Service Provider also uses security credentials bytes in the correlation token to further authenticate the request.

Figure 6:
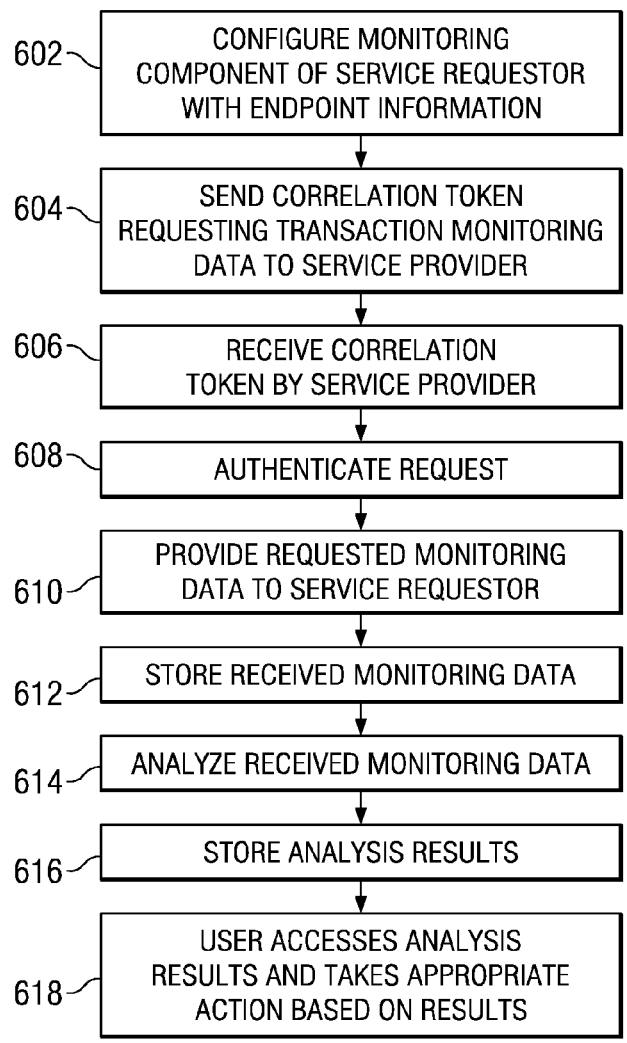
FIG. 6 is a flowchart that schematically illustrates a method for monitoring a transaction in a composite application in accordance with an exemplary embodiment.

FIG. 6 is a flowchart that schematically illustrates a method for monitoring a transaction in a composite application in accordance with an exemplary embodiment. The method is generally designated by reference number 600, and begins by configuring a monitoring component of a Service Requester with endpoint information of one or more Service Providers so that the Service Requestor may receive monitoring data from the one or more Service Providers regarding the performance of services furnished by the Service Providers (Step 602). The endpoint information can, for example, be the endpoint of a Web Service that provides the monitoring data.

A monitoring application of the Service Requestor sends a correlation token to a monitoring application of a Service Provider requesting transaction monitoring data (Step 604). According to an exemplary embodiment, the correlation token is sent in a protocol header or body. The Service Provider receives the correlation token (Step 606) and, if appropriate, sends the token to downstream processes that may be involved in providing a service to the Service Requestor. The correlation token contains information regarding the request including, for example, an identification of the Service Requestor, and a time interval for which the monitoring data is requested. The correlation token may request all the monitoring data that was gathered during the specified time interval, or request monitoring data regarding a specific transaction.

The Service Provider authenticates the Service Requestor as being authorized to receive the requested transaction monitoring data (Step 608), and if the Service Requester is authenticated, performance monitoring data relating to the transaction of interest is provided to the Service Requestor (Step 610). According to an exemplary embodiment, the monitoring data is sent as a datagraph containing the monitoring data through a secure Web services interface. If the Service Requestor is not authenticated to receive the performance monitoring data, the method ends.

The data provided to the Service Requestor is stored in a data archive unit of a monitoring component of the Service Requestor (Step 612), and is also analyzed by a data analysis engine of the monitoring component (Step 614). The results of the analysis are also stored in the data archive component (Step 616). An authorized user can access the analysis results, and use the results to accurately measure Quality of Service (QOS), to identify the root cause of a performance problem, and the like; and then take any appropriate business action based on the results (Step 618).

The present invention thus provides a computer implemented method, system and computer usable program code for monitoring a transaction that crosses an enterprise boundary in a composite application. A computer implemented method for monitoring a transaction that crosses an enterprise boundary in a composite application includes a provider enterprise of the transaction receiving a request to provide monitoring data regarding the transaction to a requester enterprise of the transaction. The received request includes a correlation token identifying the monitoring data to be provided and the requester enterprise as being authorized to receive the monitoring data. The transaction monitoring data is then provided to the requester enterprise. The provided transaction monitoring data may be analyzed by the requester enterprise to provide analysis results regarding transaction delivery performance.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for monitoring a transaction that crosses an enterprise boundary in a composite application, the computer implemented method comprising:
   receiving, at a provider enterprise of the transaction, a request to provide transaction monitoring data to a requestor enterprise of the transaction, wherein the received request comprises a correlation token that contains a plurality of fields, the plurality of fields including fields that identify the transaction monitoring data to be provided and that identify the requestor enterprise as being authorized to receive the transaction monitoring data;
   responsive to receiving the request to provide the transaction monitoring data, the provider enterprise authenticating the requestor enterprise as being authorized to receive the transaction monitoring data; and
   responsive to authenticating the requestor enterprise as being authorized to receive the transaction monitoring data, providing the transaction monitoring data to the requestor enterprise, wherein the plurality of fields further includes a field that identifies a time interval for which the monitoring data is to be provided.

2. A system for monitoring a transaction that crosses an enterprise boundary in a composite application, comprising:
   a processing unit, the processing unit comprising:
   a request receiving mechanism for a provider enterprise of the transaction to receive a request to provide transaction monitoring data to a requestor enterprise of the transaction, wherein the received request comprises a correlation token that contains a plurality of fields, the plurality of fields including fields that identify the transaction monitoring data to be provided and that identify the requestor enterprise as being authorized to receive the transaction monitoring data;
   an authenticating mechanism, responsive to receiving the request to provide the transaction monitoring data, for the provider enterprise to authenticate the requestor enterprise as being authorized to receive the transaction monitoring data; and
   a providing mechanism, responsive to authenticating the requestor enterprise as being authorized to receive the transaction monitoring data, for the provider enterprise to provide the transaction monitoring data to the requestor enterprise, wherein the plurality of fields further includes a field that identifies a time interval for which the monitoring data is to be provided.

\* \* \* \* \*